United States Patent
Lee et al.

(10) Patent No.: US 6,615,257 B2
(45) Date of Patent: *Sep. 2, 2003

(54) SECURE MULTI-USER CABLE MODEM CONFIGURATION EDITOR AND VIEWER

(75) Inventors: Glenn E. Lee, Fremont, CA (US); William L. Long, Marlboro, MA (US); Patrick S. King, Stow, MA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,647

(22) Filed: Dec. 18, 1998

(65) Prior Publication Data

US 2002/0073185 A1 Jun. 13, 2002

(51) Int. Cl.[7] .................. G06F 15/16; G06F 15/177; G06F 11/30
(52) U.S. Cl. .................. 709/222; 709/217; 709/219; 709/227; 713/200; 713/201; 713/202
(58) Field of Search .................. 709/222, 227, 709/217, 219; 370/459, 230; 713/201, 181, 202, 200

(56) References Cited

U.S. PATENT DOCUMENTS

| | | | | |
|---|---|---|---|---|
| 5,261,102 A | * | 11/1993 | Hoffman | 340/5.74 |
| 5,941,947 A | * | 8/1999 | Brown et al. | 709/225 |
| 6,012,088 A | * | 1/2000 | Li et al. | 709/219 |
| 6,041,356 A | * | 3/2000 | Mohammed | |
| 6,049,826 A | * | 4/2000 | Beser | 340/286.02 |
| 6,070,246 A | * | 5/2000 | Beser | 713/201 |
| 6,092,203 A | * | 7/2000 | Ooki et al. | 713/201 |
| 6,170,061 B1 | * | 1/2001 | Beser | 713/201 |
| 6,185,224 B1 | * | 2/2001 | Limb et al. | 370/459 |
| 6,189,102 B1 | * | 2/2001 | Beser | 713/201 |
| 6,223,222 B1 | * | 4/2001 | Fijolek et al. | 709/227 |
| 6,233,687 B1 | * | 5/2001 | White | 713/201 |
| 6,240,518 B1 | * | 5/2001 | Ooki et al. | 713/201 |

* cited by examiner

Primary Examiner—Frantz B Jean
(74) Attorney, Agent, or Firm—Blakely, Sokoloff, Taylor & Zafman LLP (57) ABSTRACT

A configuration editor receives requests to access a configuration area for a cable modem. Each configuration area corresponds to a particular user type. The configuration editor can then retrieve configuration data corresponding to the configuration area for the particular user type. An area editor selects data fields corresponding to configuration data, and allocates the data fields to one or more configuration areas corresponding to particular user types.

30 Claims, 8 Drawing Sheets

| FIELD | MSO | | IS | | PRIMARY | |
|---|---|---|---|---|---|---|
| UPSTREAM DATA RATE | ☐ R | ☐ R/W | ☐ R | ☐ R/W | ☐ R | ☐ R/W |
| ... | ... | | ... | | ... | |
| DOWNSTREAM SYMBOL RATE | ☐ R | ☐ R/W | ☐ R | ☐ R/W | ☐ R | ☐ R/W |

| CONFIGURATION FIELD | VALUE |
|---|---|
| UPSTREAM FREQUENCY | 6MHz (READ ONLY) |
| ⋮ | |
| CABLE PROXY ARP REQUESTS | ACTIVATED (READ/WRITE) |

SECURE MULTI-USER CABLE MODEM CONFIGURATION EDITOR AND VIEWER

FIELD OF THE INVENTION

The present invention pertains to the field of cable modems. More particularly, this invention relates to securely configuring a multi-user cable modem.

BACKGROUND OF THE INVENTION

Among the most promising new approaches to Internet access is the cable modem. Cable modem technology expands on existing cable television technology. Cable television networks are widely available, and the data rates possible over cable television lines are dramatically higher than over telephone lines. For example, one emerging cable modem technology can provide data rates from 25 to 1000 times faster than with traditional modems.

Unlike the point-to-point connection provided by traditional modems however, cable modems share network resources, or bandwidth. In this respect, cable modem networks are similar to many local area networks (LAN), such as an Ethernet. If one user sends or receives data over the network, less bandwidth is available for other users. In other words, one cable modem can interfere with other cable modems on the same network.

In which case, a cable service provider has an incentive to prevent certain configuration settings from being changed within cable modems so that all users have an opportunity to use the shared network resources. For instance, if one cable modem is configured to transmit at a higher output power than other cable modems on the network, the higher power cable modem could drowned out the other modems contending for access.

On the other hand, unlike normal cable television boxes, certain users may also need to configure some settings on a cable modem. For instance, if a business couples multiple computers to one cable modem, the business may need to re-configure the cable modem each time a computer is added or removed, or each time a new user is granted access to the cable modem. Similarly, an individual computer user may need to configure certain settings on a cable modem. For instance, if an employee tele-commutes from home, he or she may want to configure his or her cable modem to allow co-workers to access his or her machine over the cable network.

In each of these examples, and countless other situations, multiple users may want or need to configure various aspects of a cable modem and/or prevent others from configuring or re-configuring aspects of a cable modem.

SUMMARY OF THE INVENTION

A configuration editor receives requests to access a configuration area for a cable modem. Each configuration area corresponds to a particular user type. The configuration editor can then retrieve configuration data corresponding to the configuration area for the particular user type.

An area editor selects data fields corresponding to configuration data, and allocates the data fields to one or more configuration areas corresponding to particular user types.

Other features and advantages of the present invention will be apparent to those skilled in the art from the accompanying drawing and the detailed description that follows below.

BRIEF DESCRIPTION OF THE DRAWINGS

Examples of the present invention are illustrated in the accompanying drawings. The accompanying drawings, however, do not limit the scope of the present invention. Like references in the drawings indicate similar elements.

DETAILED DESCRIPTION

Figure 1:
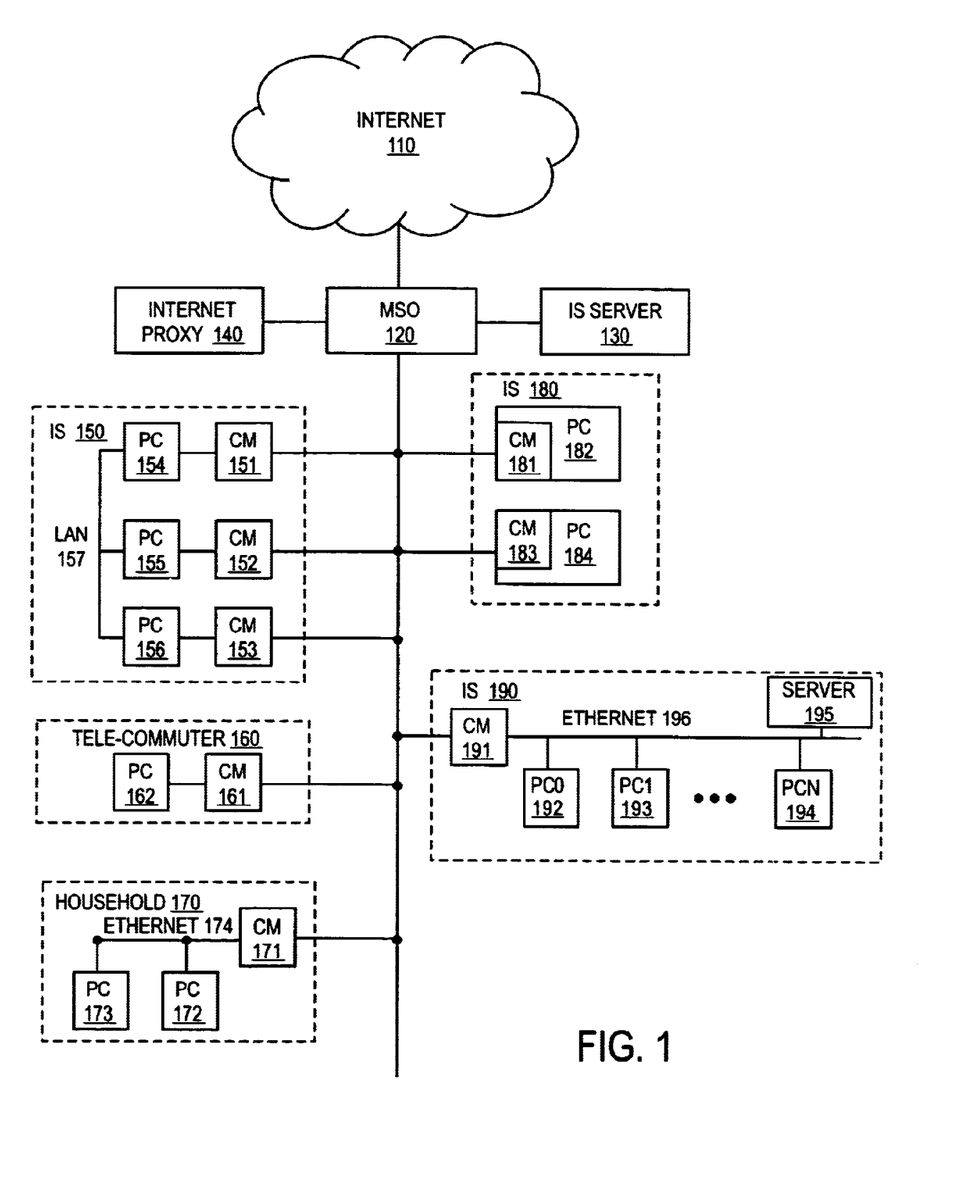
FIG. 1 illustrates one embodiment of a cable modem network.

FIG. 1 illustrates one embodiment of a cable modem network connected to the Internet 110. The network includes a multi-media service operator (MSO) 120 coupled to a number of cable modems. As discussed more fully below, associated with each cable modem is a an area editor (not shown) and configuration editor (not shown) in any of a variety of possible embodiments. In each embodiment, the area editor can be used to organize configuration data fields into customized groups corresponding to the types of users for each cable modem. The groups are referred to herein as configuration areas. And, in each embodiment, the configuration editor can be used to view and/or edit configuration data in the data fields of a particular configuration area. That is, the area editor can be used to select which configuration data is accessible from a given configuration area, and the configuration editor can be used to view and/or edit the actual configuration data in a given configuration area.

The performance and operation of each cable modem is controlled by a set of configuration data, such as downstream center frequency, downstream symbol rate, downstream framing format, upstream frequency, upstream input power level, modem authentication, modem upstream verification, etc. Data fields corresponding to the various configuration data are allocated to one or more configuration areas by the area editor. For example, the configuration areas for a given cable modem may include configuration areas for a variety of user types, such as a MSO area, an information services (IS) area, and a primary user area. In one embodiment, the data fields can be allocated as read/write fields or read only fields in any of the configuration areas. In which case, the configuration data corresponding to the data fields in a particular configuration area can be viewed and/or edited by the configuration editor.

A cable modem network may connect a wide variety of cable modem users, and each cable modem user may have different configuration needs. The embodiment of FIG. 1 illustrates several different cable modem configurations for a variety of cable modem users. The network includes tele-commuter 160, household 170, and information services (IS) 150, 180, and 190. An IS may represent any of a number of entities, such as businesses, schools, etc., in which an IS manager oversees the computer systems within the respective entities.

IS 150 includes three personal computers (PC) 154, 155, and 156 coupled to external cable modems (CM) 151, 152, and 153, respectively. Each PC in IS 150 is also coupled to a separate internal local area network (LAN) 157 to provide for communications among the PCs in IS 150. In which case, each cable modem can be dedicated to the respective PC, and configured accordingly.

IS 180 includes two PCs 182 and 184 with internal cable modems 181 and 183, respectively. IS 180 does not include a local area network (LAN), but IS 180 may use the cable network to provide communications between PCs 182 and 184. In which case, cable modems 181 and 183 may need to be configured to provide security, such as encryption, for communications among PCs 182 and 184 over the publicly accessible cable network.

IS 190 includes one cable modem 191 coupled to a number of personal computers, PC0 192, PC1 193, and PCN 194, and server 195 over a local area network, Ethernet 196. Since a number of computers are coupled to one cable modem, cable modem 191 may need to be configured to direct incoming data to the appropriate computer or to server 195. Cable modem 191 may also need to be re-configured each time a PC is added or removed from Ethernet 196. Since a potentially large number of PCs may be coupled to cable modem 191, IS 190 may also configure cable modem 191 for additional bandwidth or quality of service on the cable network, at extra cost, in order to accommodate all the PCs.

Tele-commuter 160 has an external, dedicated cable modem 161 coupled to his or her PC 162. Tele-commuter 160, for instance, could be an employee or contractor for any of the ISs on the network. Depending on the IS, cable modem 161 may have different configuration needs. For instance, the cable modem network could be used as a LAN between tele-commuter 160 and any one the ISs, having different access requirements for each different IS set-up. Telecommuter 160 may need to re-configure cable modem 161 from time to time in order to communicate with a different IS. Tele-commuter 160 may also use cable modem 161 for personal Internet access. In which case, tele-commuter 160 may want to configure cable modem 161 to limit access to his or her PC 162 from an employer IS. Alternately, tele-commuter 160 could configure cable modem 161 to provide one or more of the above types of access simultaneously.

Household 170 includes two PCs, 172 and 173, coupled to cable modem 171 over Ethernet 174. For instance, household 170 may include one computer for the parents and one computer for the children. In which case, one or both of the parents may act like an IS manager, configuring cable modem 171 to limit certain kinds of access from one PC or the other, and to direct incoming data to the appropriate PC, or to configure accesses to different Internet service providers.

Alternately, household 170 may include two tele-commuters. For instance, a husband may work for, and tele-commute to, IS 150, and a wife may work for, and tele-commute to, IS 190. In which case, cable modem 171 may need to be configured for multiple ISs simultaneously, or in the alternative.

In many of these examples, both a primary user and an IS manager need to be able to configure at least some aspects of one or more cable modems. An MSO, such as MSO 120, may have additional configuration concerns. For instance, where network resources are shared, an MSO needs to configure at least some aspects of all cable modems on the network to ensure appropriate allocation of network resources.

In one network embodiment, downstream data communications are similar to cable television signals. That is, data communications are sent downstream from a headend or hub, such as MSO 120, to all of the cable modems on the network. Then, a given cable modem selectively passes only the data that is intended for one of the computers coupled to the modem.

Unlike cable television signals, however, data communications may also be sent upstream to the headend, MSO 120, from the cable modems. In one embodiment, data communications are sent upstream over the cable network, but only when the respective cable modem has access to the cable network. In which case, every cable modem must be configured to share access to upstream data traffic. For instance, each cable modem may be assigned a periodic time slot during which the respective cable modem has exclusive upstream access, requiring all active cable modems to be synchronized. Cable modems may also contend for free time slots, requiring resource arbitration, or creating the potential for data collisions on the network when more than one modem tries to send data at the same time. Numerous additional sharing schemes are possible, each involving various configuration requirements.

Another network related configuration problem in one embodiment is a result of different upstream and downstream bandwidths. Since all downstream data is sent to all of the cable modems simultaneously, and since most users download more data than they upload, downstream bandwidth is usually larger, and therefore faster, than upstream bandwidth. If a cable modem user uploads large amounts of data, the data is sent upstream at the relatively slower upstream data rate to MSO 120 and relayed from there. For example, a server which routinely sends large files upstream on a cable modem network can substantially reduce upstream bandwidth available to other cable modems.

To reduce this problem, servers can be moved to the headend, such as IS server 130 coupled to MSO 120, so that all downloading from the server is done at the faster downstream data rate. If, for instance, both IS 150 and IS 180 shared space in IS server 130, however, MSO 120 would have to protect the respective sets of data. For instance, the respective cable modems could be configured by MSO 120 to provide access lists which could be edited by IS 150 and IS 180 to add or remove users over time.

Internet access can also cause configuration problems. In the illustrated embodiment, MSO 120 is coupled to Internet proxy 140. Since the data rates on the cable modem network are often faster than data rates over telephone connections in Internet 110, MSO 120 can download copies of popular Internet web pages, for instance, and store the copies in Internet proxy 140 for faster access. Similarly, network users may maintain web pages on internet proxy 140 in order to reduce the amount of internet traffic on the cable network. In each of these cases, and a variety of other situations, the cable modems on the network may need to be configured by MSO 120, an IS manager, a primary user, etc. to take advantage of Internet proxy 140.

Those skilled in the art will recognize that the embodiment of FIG. 1 represents only a fraction of the possible configuration scenarios and user types in a cable modem network. Countless additional configurations and user types are possible, requiring different configuration settings and configuration areas for each.

Figure 2:
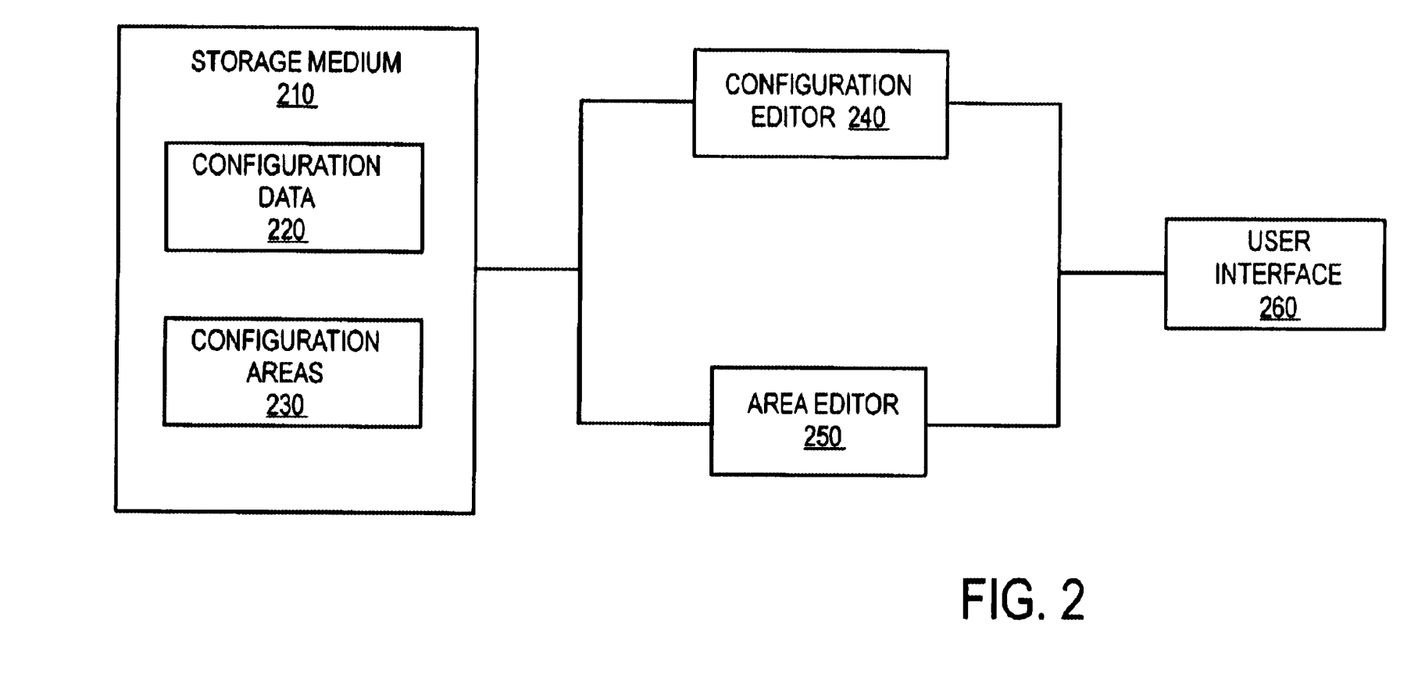
FIG. 2 illustrates one embodiment of the components of the present invention.

FIG. 2 illustrates one embodiment of storage medium 210, configuration editor 240, area editor 250, and user interface 260 coupled as shown. The components of FIG. 2 can be configured in a variety of hardware and/or software embodiments for use with a wide variety of cable modem configurations, such as those described above with reference to FIG. 1. For instance, user interface 260 could represent a local or remote personal computer, work station, or other computing unit, with a graphical user interface. Configuration editor 240 and area editor 250 could be a single software package, or two separate software packages, executed on the personal computer. Storage medium 210 could represent multiple storage areas and memory interfaces. For instance, a memory within the personal computer could be used to store the configuration areas and a memory within a cable modem could be used for storing the configuration data.

In another embodiment, all of the components of FIG. 2 could be included in a single cable modem. For instance, a cable modem may include a small liquid crystal display and keypad for user interface 260, a memory for storage area 210, and an application specific integrated circuit (ASIC) to perform the functions of configuration editor 240 and area editor 250. Countless other embodiments are possible in which components are combined or rearranged, or in which area editor 250 is eliminated.

Figure 3:
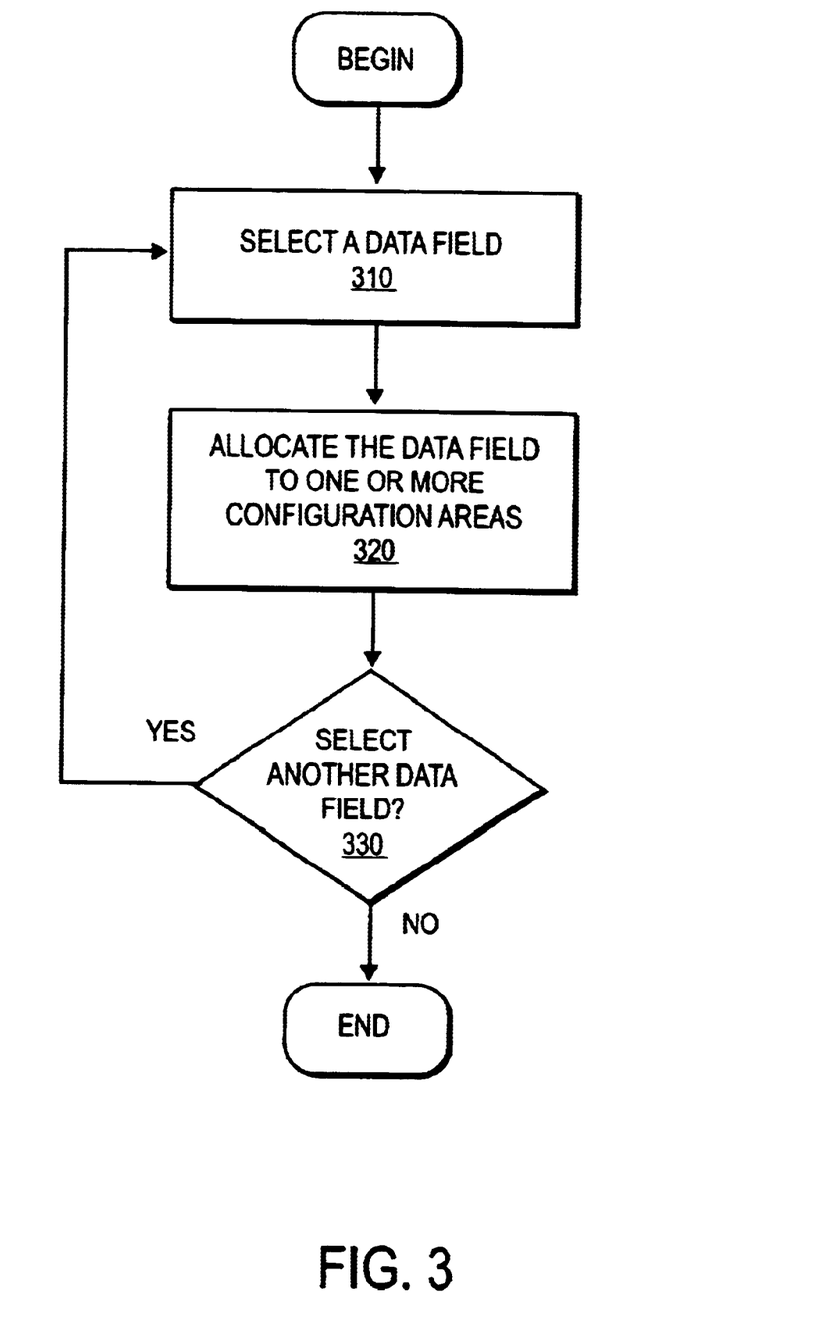
FIG. 3 demonstrates the function of one embodiment of an area editor.

FIG. 3 demonstrates one embodiment of area editor 250. First a data field is selected in step 310. For example, a graphical user interface could display a list of configuration fields from which to choose. Then a user could identify one of the fields from the list and area editor 250 could select the field. Alternately, in a command driven user interface, a user could type in a command followed by the name of a particular configuration field to instruct the area editor which configuration field should be allocated.

Once a configuration field is selected, an allocation unit within the area editor can allocate the field to one or more configuration areas in step 320. The configuration areas to which a data field is allocated may depend on a user-type for each area. A more sophisticated user may have greater access. For instance, an upstream data frequency field may be allocated as a read/write field in a MSO configuration area because an MSO may need to change the data value over time as network traffic increases. The same data field, however, may be allocated as read only, or may not be allocated at all, to an IS configuration area or a primary user configuration area, because tampering with the data value on one modem could interfere with the entire network operation.

Figure 4:
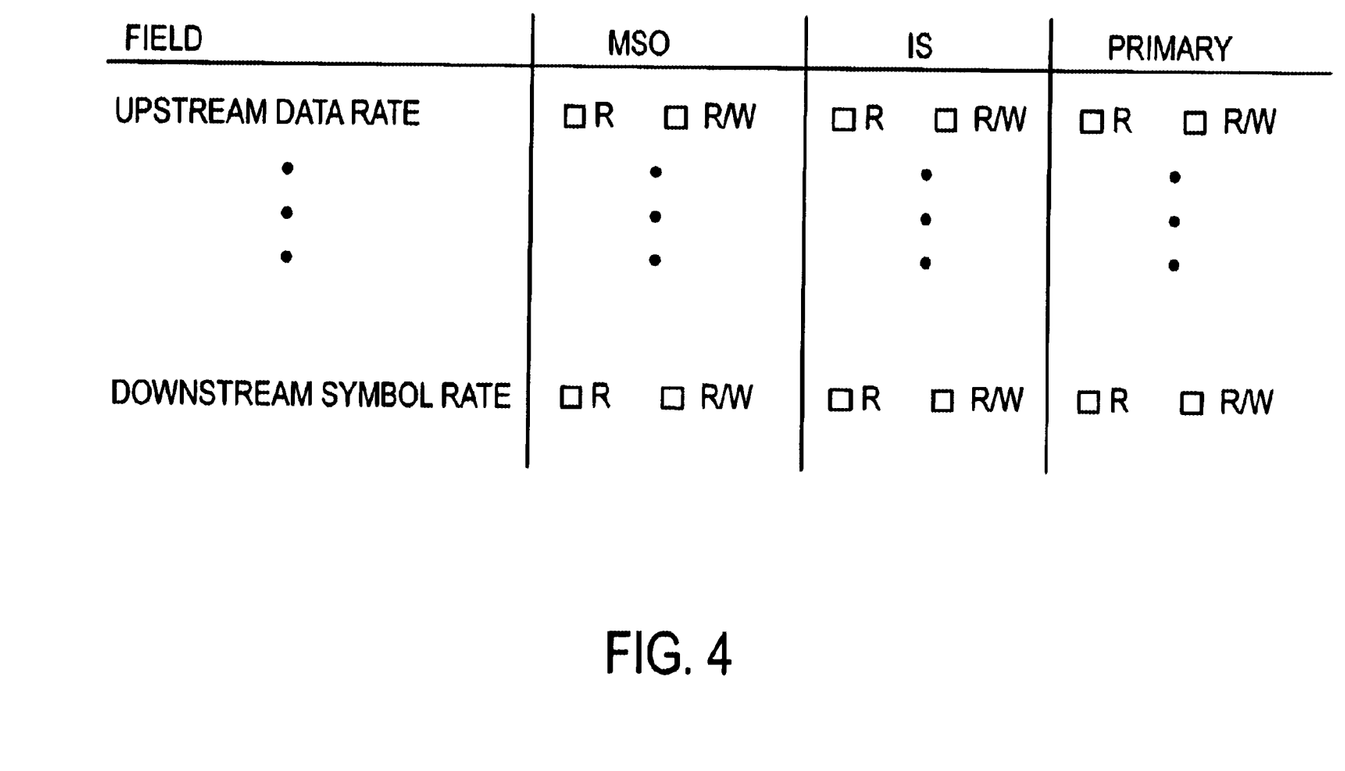
FIG. 4 illustrates one embodiment of a display provided by an area editor.

A graphical user interface may provide a table such as the one illustrated in FIG. 4. In which case, a user both indicates a selection and an allocation by checking a read only box (R), a read/write box (R/W), or by not checking any boxes at all for each field, and for each configuration area. Alternately, in a command driven system, a user could type in commands for the area editor to allocate a selected field. In step 330, additional fields can be selected and allocated. Otherwise, the process ends.

In one embodiment, the number and titles of configuration areas are predetermined. The fields that are allocated to configuration areas can also be predetermined. For instance, when a cable modem is manufactured, an area editor could be used to permanently establish the configuration areas and the contents of the configuration areas. Alternately, an area editor could include an area generator to dynamically create new configuration areas based on user type, delete existing configuration areas, and/or modify the names of configuration areas.

If configuration areas can be dynamically created or modified, secure access to the area editor may be needed to prevent inadvertent or intentional tampering with the contents of configuration areas. Any number of security measures could be used, such as a login, or user-type, and a password, voice recognition, or various types of anatomical recognition including face recognition, thumb print scan, retina scan, etc. For instance, the area editor could include a verification unit to verify authority before granting access to the table shown in FIG. 4. Alternately, the verification unit could verify authority for each data field after it is selected and before it is allocated. In which case, levels of access authority could be created in which a user could allocate only those data fields for which the user has allocation authority.

In one embodiment, area editor 250 is only be available from the MSO for a given cable network. In which case, a primary user or IS manager would have to contact the MSO to have a configuration area created or to have the group of data fields in a configuration area modified. Those skilled in the art will recognize numerous additional embodiments are possible.

Figure 5:
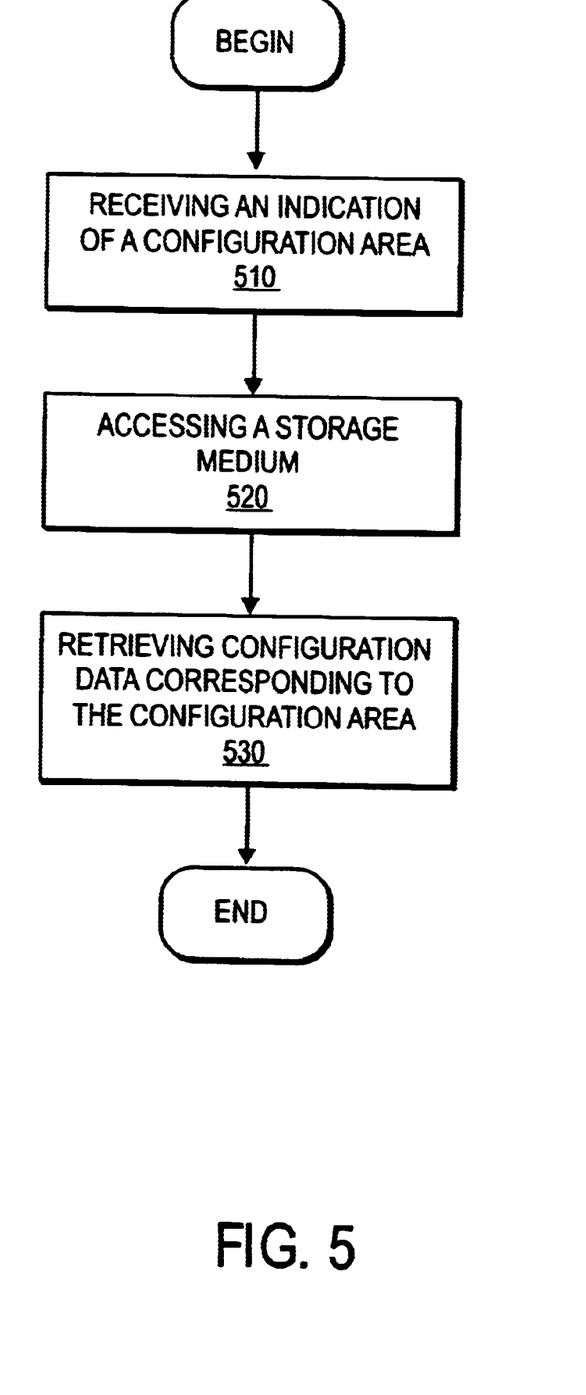
FIG. 5 demonstrates the function of one embodiment of a configuration editor.

FIG. 5 demonstrates one embodiment of configuration editor 240. First, in step 510, the configuration editor receives an indication of a configuration area. For instance, a user may select a configuration area from a list of areas displayed on a graphical user interface. Or, a user may type in a command followed by a configuration area name. Alternately a user may select or type in a specific configuration data field and the configuration area from which the user wishes to access the data.

In step 520, the configuration editor accesses a storage medium. This could involve more than one memory device. For instance, the configuration editor may access a memory in a personal computer to identify the set of data fields in the configuration area, and access a memory in the cable modem to locate the configuration data corresponding to the data fields in the configuration area.

Figure 6:
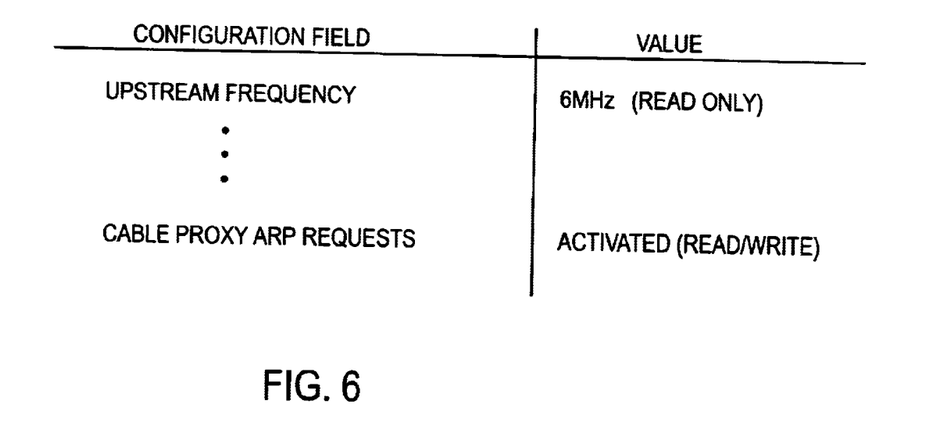
FIG. 6 illustrates one embodiment of a display provided by a configuration editor.

In step 530, the configuration editor retrieves configuration data corresponding to the configuration area. For instance, the configuration editor may provide a display like that shown in FIG. 6. Each data field in the configuration area is listed in the left hand column. In the right hand column, the configuration editor has interpreted the configuration data in order to display the values in a meaningful way for the user. Based on the configuration area settings, the listed values are displayed as read only or read/write, depending on the configuration needs of the user type for the particular configuration area. Those skilled in the art will recognize that a variety of alternate embodiments are possible.

Of course, convenient access to only those configuration data of interest to a particular user is of only limited utility if other user types can inadvertently or intentionally tamper with the configuration settings. So, not only can configuration areas provide convenient access to groups of configuration data fields, separate configuration areas can also provide secure access. A variety of access authorization techniques could be used, including passwords, voice recognition, and various forms of anatomical identification, such as thumb print, face recognition, retina scan, etc.

In certain embodiments, configuration areas may be based on levels of sophistication. For instance, a primary user may only have access to a primary user area, an IS manager may have access to the primary user area and an IS area, and an MSO may have access to the primary user area, the IS area, and an MSO area. There may also be sub-levels of configuration areas. For instance, a primary user who only has an email account may have less access to configuration settings than a primary user with a web page, a server, etc.

Certain kinds of configuration data may need to be keep secret from other users, including more sophisticated users. For instance a company or government organization may store classified information that must only be accessible to certain individuals. In which case, an MSO may be allowed to create a configuration area for an IS, but the MSO may not have access to the configuration data associated with the data fields in the configuration area. Those skilled in the art will recognize that numerous additional embodiments are possible.

Any number of hardware systems can be used to perform the functions of the area editor and/or the configuration editor. For example, the area editor and/or configuration editor may be represented by a broad category of computer systems known in the art, such as a computer system equipped with a high performance microprocessor(s), such as the Pentium® processor, Pentium® Pro processor, or Pentium® II processor manufactured by and commonly available from Intel Corporation of Santa Clara, Calif., or a workstation such as the UltraSPARC® manufactured by Sun Microsystems, Inc. of Mountain View, Calif.

Figure 7:
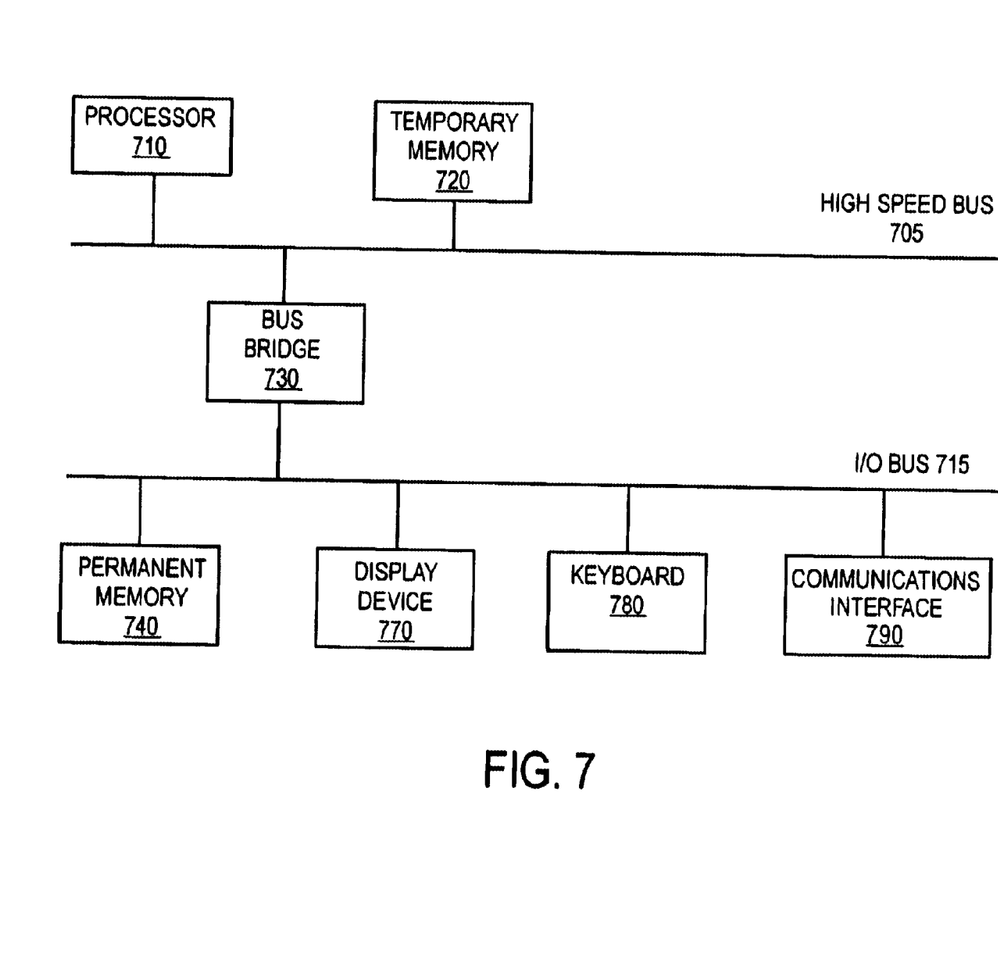
FIG. 7 illustrates one embodiment of a hardware system to perform the functions of an area editor and/or a configuration editor.

FIG. 7 illustrates one embodiment of a suitable hardware system. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. Display device 770, keyboard 780, and communications interface 790 are also coupled to bus 715.

Certain embodiments may include additional components, may not require all of the above components, or may combine one or more components. For instance, temporary memory 720 may be on-chip with processor 710. Alternatively, permanent memory 740 may be eliminated and temporary memory 720 may be replaced with an electrically erasable programmable read only memory (EEPROM), wherein software routines are executed in place from the EEPROM. Some implementations may employ a single bus to which all of the components are coupled. Additional components may be included in the hardware system, such as additional processors, storage devices like a CD ROM, memories, and other peripheral components known in the art, and the additional components may be coupled to one or more additional buses through additional bus bridges.

Figure 8:
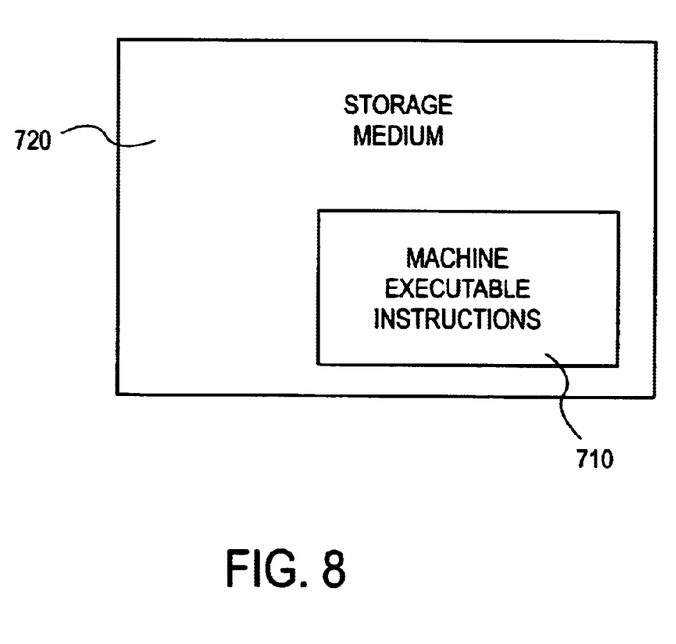
FIG. 8 illustrates one embodiment of a machine readable storage medium.

In one embodiment, the configuration editor and/or the area editor, as discussed above, are implemented as a series of software routines run by the hardware system of FIG. 7. These software routines comprise a plurality or series of instructions to be executed by a microprocessor in a hardware system, such as processor 710 of FIG. 7. Initially, the series of instructions can be stored on a storage device, such as permanent memory 740. As shown in FIG. 8, it is to be appreciated that the series of instructions can be machine executable instructions 710 stored using any machine readable storage medium 720, such as a diskette, CD-ROM, magnetic tape, digital video or versatile disk (DVD), laser disk, ROM, Flash memory, etc. It is also to be appreciated that the series of instructions need not be stored locally, and could be received from a remote storage device, such as a server on a network, a CD ROM device, a floppy disk, etc., through, for instance, communications interface 790. The instructions may be copied from the storage device into temporary memory 720 and then accessed and executed by processor 710. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the configuration editor and/or area editor. In another example, the configuration editor and/or area editor could be implemented in one or more ASICs on an additional circuit board and the circuit board could be inserted into the hardware system of FIG. 7.

Thus, a secure, multi-user configuration editor and viewer for a cable modem is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   receiving a request to access a configuration area from a plurality of configuration areas, the plurality of configuration areas corresponding to a particular cable modem, each configuration area including one or more data fields from a plurality of data fields, each of the plurality of data fields corresponding to a unit of configuration data for the cable modem, each configuration area corresponding to a user type for the cable modem; and
   displaying the one or more data fields in the configuration area by displaying the corresponding unit of configuration data along with associated access right for each of the unit of configuration data.

2. The method of claim 1 further comprising:
   accessing a storage medium, said storage medium storing the configuration data for the cable modem; and
   retrieving the unit of configuration data corresponding to each of the data fields included in the configuration area.

3. The method of claim 1 wherein the configuration area is predetermined by preallocating the one or more data fields to the configuration area.

4. The method of claim 1 wherein the configuration area is determined dynamically based on the user type configured for the cable modem using an area editor with security measures, wherein the security measures include verifying authority to access and to allocate the one or more data field to the configuration area.

5. The method of claim 4 wherein verifying the authority to access and to allocate comprises verifying an access authority to the area editor and to the one or more data field.

6. The method of claim 1 wherein the access right comprises one of not available, read only, and read/write.

7. The method of claim 6 further comprising: modifying the unit of configuration data when there is a write access.

8. A method comprising:
   selecting a configuration area among a plurality of configuration areas, the plurality of configuration areas corresponding to a particular cable modem, each of said plurality of configuration areas including a set of data fields, wherein each set of data fields corresponds to a user type, and wherein each data field corresponds to a particular unit of configuration data, each of said plurality of configuration areas used to configure the cable modem;

retrieving the unit of the configuration data corresponding to each of the data fields in the set of data fields included in the selected configuration area from a storage medium; and displaying the unit of the configuration data corresponding to each of the data fields in the set of data fields included in the selected configuration area along with the access authority to the unit of the configuration data.

9. The method of claim 8 wherein selecting the configuration area comprises:

verifying access authority to the configuration area.

10. The method of claim 8, further comprising:

modifying one or more unit of configuration data having a write access authority to generate a modified configuration area.

11. The method of claim 10 wherein the modified configuration area is used to reconfigure the corresponding cable modem.

12. An apparatus comprising:

a storage medium configured to store a plurality of units of configuration data for a cable modem;

an area editor coupled with the storage medium, said area editor configured to select one or more data field from a plurality of data fields, each of the plurality of data fields corresponding to a unit of the configuration data, said area editor further configured to allocate the one or more selected data field to a configuration area of a plurality of configuration areas corresponding to the cable modem, each of said plurality of configuration areas corresponding to a different user type, and each of said plurality of configuration areas comprising a set of one or more data fields; and a configuration editor coupled with the storage medium and the area editor, wherein in response to a request to access the configuration area said configuration editor retrieves from the storage medium one or more unit of configuration data corresponding to the one or more selected data fields allocated to the configuration area and displays the one or more unit of configuration data and associated access rights.

13. The apparatus of claim 12 wherein the area editor comprises:

a user interface configured to receive a request to allocate the one or more data field to the configuration area; and a memory interface coupled with the user interface and configured to retrieve the one or more data field from the storage medium.

14. The apparatus of claim 13 wherein the area editor further comprises:

a verification unit coupled with the user interface and the memory interface, said verification unit configured to verify authority to retrieve the plurality of data fields from the storage medium before retrieving the plurality of data fields, and to verify authority to allocate the one or more data field to the configuration area.

15. The apparatus of claim 14 wherein the verification unit verifies authority by using at least one of recognize a password, recognize a voice print, and recognize an anatomical feature.

16. The apparatus of claim 12 wherein in addition to displaying the one or more unit of configuration data, the configuration editor further displays access right to the one or more unit of configuration data, said access right including one of not available, read only, and read/write.

17. The apparatus of claim 12 wherein the area editor comprises:

an area generator configured to generate the configuration area based on the selected one or more data field, the configuration area associated with a particular user type.

18. An apparatus comprising:

a storage medium configured to store configuration data for a cable modem; and a configuration editor coupled with the storage medium, said configuration editor configured to:

receive a request to access a particular configuration area among a plurality of configuration areas, the plurality of configuration areas corresponding to a particular cable modem, each of said plurality of configuration areas including a set of data fields, wherein a particular set of data fields corresponds to a corresponding user type for a respective configuration area, and wherein each data field corresponds to a particular unit of the configuration data;

to retrieve from the storage medium at least one unit of configuration data corresponding to a set of data fields comprising the particular configuration area; and to display the at least one unit of configuration data retrieved from the storage medium along with access right for each unit of configuration data.

19. The apparatus of claim 18 wherein the configuration editor comprises:

a user interface configured to identify a user name corresponding to a user type for the particular configuration area, and to verify access authority to the particular configuration area.

20. The apparatus of claim 19 wherein the user interface is further configured to display a table of all of the units of configuration data corresponding to the set of data fields included in the particular configuration area.

21. The apparatus of claim 18 wherein the access right for each unit of the configuration data is one of not available, read only and read/write.

22. An article comprising:

a storage medium;

the storage medium having stored thereon a plurality of instructions that, when executed by a machine, result in receiving a request to access a configuration area from a plurality of configuration areas, each configuration area including one or more data fields from a plurality of data fields, each of the plurality of data fields corresponding to a unit of configuration data for a cable modem, the configuration area corresponding to a user type configured for the cable modem; and displaying the one or more data fields in the configuration area by displaying the corresponding unit of configuration data along with associated access right for each of the unit of configuration data.

23. The article of claim 22, wherein the configuration area is predetermined by preallocating the one or more data fields to the configuration area.

24. An article comprising:

a storage medium;

the storage medium having stored thereon a plurality of instructions that, when executed by a machine, result in selecting a configuration area among a plurality of configuration areas, the plurality of configuration areas corresponding to a particular cable modem, each of said plurality of configuration areas including a set of data fields, wherein each set of data fields corresponds to a user type, and wherein each data field corresponds to a particular unit of configuration data, each of said plurality of configuration areas used to configure the cable modem;

retrieving the unit of the configuration data corresponding to each of the data fields in the set of data fields included in the selected configuration area; and displaying the unit of the configuration data corresponding to each of the data fields in the set of data fields included in the selected configuration area along with associated access right.

25. The article of claim 24, wherein selecting the configuration area comprises verifying access authority to the configuration area.

26. A method comprising:

selecting a configuration area from a plurality of configuration areas, the plurality of configuration areas corresponding to a particular network access device, each configuration area including one or more data fields from a plurality of data fields, each of the plurality of data fields corresponding to a unit of configuration data for the network access device, the configuration area corresponding to a user type configured for the network access device; and displaying the one or more data fields in the configuration area by displaying the corresponding unit of configuration data along with associated access right for each of the unit of configuration data.

27. The method of claim 26, wherein selecting the configuration area comprises:

accessing the configuration area from a storage medium; and retrieving the unit of configuration data corresponding to each of the data fields included in the configuration area.

28. The method of claim 26, wherein the access right is one of read only, and read/write.

29. The method of claim 28 further comprising:

modifying the unit of configuration data when the associated access right is a write access.

30. The method of claim 29, wherein modifying the unit of configuration data comprises verifying an access authorization prior to allowing said modifying the unit of configuration data.

* * * * *